No. 770,081. PATENTED SEPT. 13, 1904.
C. M. LEWIS.
LINK BELT OR CHAIN.
APPLICATION FILED JAN. 5, 1903.
NO MODEL.
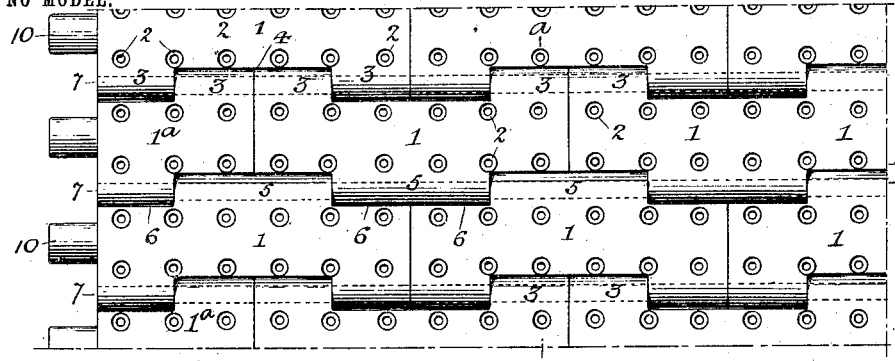
Fig. 1.
Fig. 2.
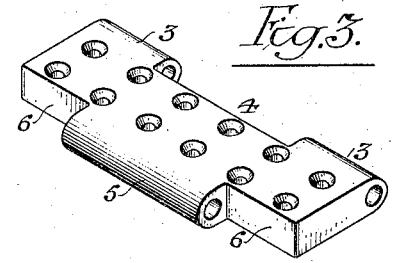
Fig. 3.
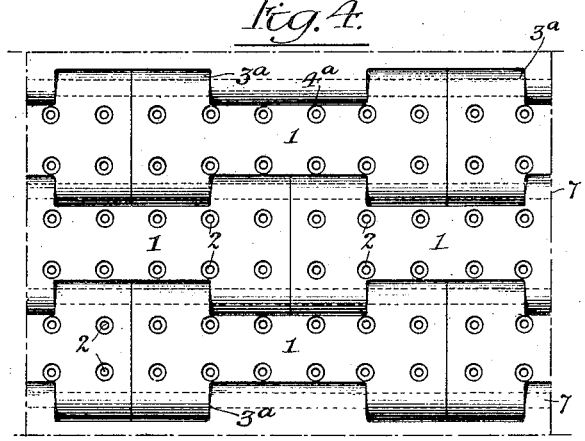
Fig. 4.
Fig. 6.
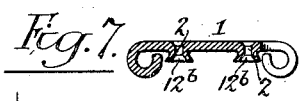
Fig. 7.
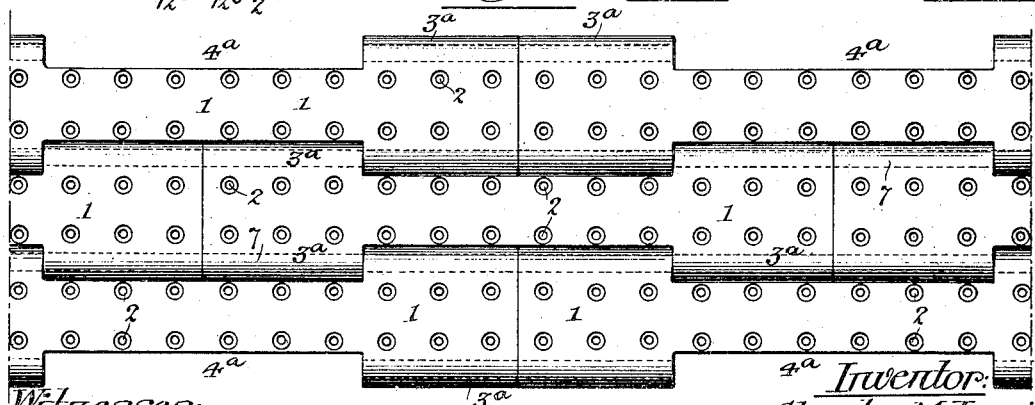
Fig. 5.
Witnesses:
A. B. Coppee
Hamilton D. Turner
Inventor:
Charles M. Lewis
by his Attorneys
Howson & Howson No. 770,081. Patented September 13, 1904.

UNITED STATES PATENT OFFICE.

CHARLES M. LEWIS, OF CAMDEN, NEW JERSEY.

LINK BELT OR CHAIN.

SPECIFICATION forming part of Letters Patent No. 770,081, dated September 13, 1904.

Application filed January 5, 1903. Serial No. 137,805. (No model.)

*To all whom it may concern:*

Be it known that I, CHARLES M. LEWIS, a citizen of the United States, and a resident of Camden, New Jersey, have invented certain Improvements in Link Belts or Chains, of which the following is a specification.

My invention relates to the splint-carrying belts or chains of match-making machines; and it consists of an improved belt or chain of this character and for this purpose designed to insure the greatest amount of flexibility and to present continuous unbroken lines of perforations to receive the match-splints.

My invention is fully illustrated in the accompanying drawings, in which—

Figure 1 is a plan view of a portion of a belt or chain made in accordance with my invention. Fig. 2 is a cross-sectional view taken on the line $a\,a$, Fig. 1. Fig. 3 is a perspective view of one of the links of the belt or chain shown in Figs. 1 and 2. Figs. 4 and 5 are plan views similar to Fig. 1, illustrating modified forms of belts or chains embodying my invention. Fig. 6 is a similar plan view illustrating another modification, and Fig. 7 is a sectional view of one of the links shown in Fig. 6.

The belt or chain forming the subject of my invention is composed of a series of links, which links are in the form of flat plates with projecting portions on each side having apertures in line with the links, the projecting portions of one link breaking joint with the projecting portions of the other links and the whole held together by hinge-pins passed transversely across the belt or chain through the apertures of said projections.

In the form of belt or chain shown in the various figures each link 1 has a series of apertures 2 to receive the splints arranged in rows and extending from end to end of the same. In the form of belt or chain shown in Fig. 1 the links have on one side the apertured projections 3, with the spaces 4 between the same, and on the opposite side of said link the apertured projection 5, which corresponds in length to the recess 4, the link being cut away at the ends at 6, such cut-away portions corresponding in length to the apertured projections 3 on the opposite side of the link. These links are held together by the rods or pins 7, passed through the apertures of the meshing projections 3 and 5.

The end links, which are half-links for every other row of the belt or chain, as shown at 1ª, are provided with projecting pins 10 for engagement with the sprocket-wheels, whereby the said chain is moved, although in some instances—as, for insance, the form of belt or chain shown in Figs. 6 and 7—the pins for engagement with the sprocket-wheels may be extensions of the rods 7 for holding the links together to form the chain or belt, such extensions being provided with enlarged bushings 11.

Upon reference to the sectional view Fig. 2 it will be noted that the perforations 2 to receive the splints are beveled at each end at 12, as shown, so that said splints will be readily guided into place from one side and the expeller-pins may be guided from the other side to discharge the splints. The splints are held by the frictional contact of the walls of said apertures 2 with the same.

In this belt or chain the meeting ends of the links are covered and the joints are broken by means of the projecting portions 5 of the adjoining links.

In the form of links shown in Figs. 4 and 5 each link is provided at each end and on both sides with the projections 3ª, and the spaces 4ª between these projections are adapted to receive the projections 3ª of adjoining links, the end joints between such adjoining links being broken by the solid body portion of each link. In this form of the belt or chain the connecting-bars of pivot-pins pass through portions of each link on each side of the same, and it is consequently of stiffer construction than that illustrated in Fig. 1. It will also be noticed that the projecting portions of the links shown in Fig. 5 are double the length of those shown in Fig. 4, making a link of the same shape, but twice the length of those shown in the latter figure.

The links of which my improved belt or chain is composed are generally cut from solid metal and have their apertures both to receive the splints and the pivot-pins formed by drilling. In Figs. 6 and 7, however, I have shown a form of link made of sheet metal pressed into shape, the projecting portions $3^b$ and $5^b$ to receive the pivot pins or rods being bent into form and the walls of the apertures 2 projecting on the under face of the link, the openings being beveled at $12^b$ in the same manner and for the same purpose as in the other links.

In all forms of this belt or chain the links are preferably only wide enough to receive two splints, and this arrangement insures greater flexibility by shortening the distance between the connecting portions of the chain and enables the chain to pass around sprocket wheels or pulleys of much smaller diameter than those usually employed in match-making machines with belts or chains of this general character. The width, however, is not arbitrary, and for some uses wider links may be employed.

Having thus described my invention, I claim and desire to secure by Letters Patent—

1. In a belt or chain, the combination of the interlocking links having apertures for the reception of splints, apertured projections on either side of the same and rods adapted to pass through the apertures of said projections to form the said links into a continuous belt or chain, the end meeting faces of said links having their joints broken by the body portions of adjoining links.

2. In a belt or chain, the combination of the links having apertures for the reception of splints, offset projections on each side having apertures, rods passing through said apertures and forming the pivot or joint for the links, a central offset portion on one side of each link breaking joint with the meeting ends of the links having the end offset projections.

3. In a belt or chain, the combination of the links having apertures for the reception of splints, offset projections on each side having apertures, rods passing through said apertures and forming the pivot or joint for the links, a central offset portion on one side of each link breaking joint with the meeting ends of the links having the end offset projections, and projections carried by the end links and serving to engage the sprocket-wheels whereby the chain is moved.

4. In a belt or chain, the combination of the interlocking links having apertures for the reception of splints, apertured projections on either side of the same, and rods adapted to pass through the apertures of said projections to form the said links into a continuous belt or chain, said rods projecting beyond the end links and serving to engage the sprocket-wheels whereby the chain is moved.

5. In a belt or chain, the combination of the interlocking links having apertures for the reception of splints, apertured projections on either side of the same, and rods adapted to pass through the apertures of said projections to form said links into a continuous belt or chain, the end meeting faces of said links having their joints broken by the body portions of adjoining links, and said splint apertures being beveled at each end, substantially as described.

In testimony whereof I have signed my name to this specification in the presence of two subscribing witnesses.

CHARLES M. LEWIS.

Witnesses:
MURRAY C. BOYER,
JOS. H. KLEIN.